(12) United States Patent
Card, II (10) Patent No.: US 9,098,227 B2
(45) Date of Patent: Aug. 4, 2015

(54) SYSTEM AND METHOD FOR EMPLOYING A CONTROLLED MODIFICATION CURRENT TIME VALUE

(75) Inventor: John A. Card, II, Denver, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 1750 days.

(21) Appl. No.: 12/263,163

(22) Filed: Oct. 31, 2008

(65) Prior Publication Data

US 2009/0119534 A1 May 7, 2009

Related U.S. Application Data (60) Provisional application No. 60/984,101, filed on Oct. 31, 2007.

(51) Int. Cl.
*G06F 1/04* (2006.01)
*G06F 1/14* (2006.01)
*G06F 21/10* (2013.01)
*G06F 21/72* (2013.01)

(52) U.S. Cl.
CPC .. *G06F 1/14* (2013.01); *G06F 1/04* (2013.01); *G06F 21/10* (2013.01); *G06F 21/725* (2013.01)

(58) Field of Classification Search
USPC .............. 713/170, 178, 600; 726/226, 27
See application file for complete search history.

(56) References Cited

U.S. PATENT DOCUMENTS

| | | | | |
|---|---|---|---|---|
| 4,602,375 | A * | 7/1986 | Inukai | 375/358 |
| 5,500,897 | A * | 3/1996 | Hartman, Jr. | 713/178 |
| 5,701,446 | A | 12/1997 | Abali et al. | |
| 6,708,281 | B1 * | 3/2004 | Walsh | 713/400 |
| 7,065,679 | B2 * | 6/2006 | Nakamura et al. | 714/47 |
| 7,146,504 | B2 * | 12/2006 | Parks et al. | 713/178 |
| 7,266,714 | B2 * | 9/2007 | Davies et al. | 713/500 |
| 7,496,741 | B2 * | 2/2009 | Lee | 713/1 |
| 2003/0233553 | A1 | 12/2003 | Parks et al. | |
| 2004/0117619 | A1 * | 6/2004 | Singer et al. | 713/156 |
| 2005/0223297 | A1 | 10/2005 | Nakamura et al. | |
| 2005/0276167 | A1 | 12/2005 | Davies et al. | |
| 2006/0150254 | A1 | 7/2006 | Siukonen | |
| 2006/0156417 | A1 * | 7/2006 | Choi | 726/27 |
| 2006/0265623 | A1 * | 11/2006 | Dinescu | 713/600 |

FOREIGN PATENT DOCUMENTS

EP 1679633 A 7/2006

* cited by examiner

*Primary Examiner* — Khanh Dang
(74) *Attorney, Agent, or Firm* — Lowe Graham Jones PLLC (57) ABSTRACT

A method for employing a controlled-modification current time value is presented. In the method, the current time value is maintained. Also, requests for modification of the current time value are received. The requests are processed so that the requested modification associated with one of the requests is immediately incorporated into the current time value, and so that the requested modification associated with another one of the requests is not immediately incorporated into the current time value.

3 Claims, 6 Drawing Sheets

SYSTEM AND METHOD FOR EMPLOYING A CONTROLLED MODIFICATION CURRENT TIME VALUE

CROSS-REFERENCE TO RELATED APPLICATIONS

This application claims the benefit of U.S. Provisional Application No. 60/984,101, entitled "SYSTEM AND METHOD FOR EMPLOYING A CONTROLLED-MODIFICATION CURRENT TIME VALUE" and filed Oct. 31, 2007, which is hereby incorporated herein by reference in its entirety.

BACKGROUND

For decades, a serious and longstanding concern of providers of artistic or expressive content has been "piracy," or access to such content by people unauthorized or unlicensed to do so. Such piracy may result in significant revenue losses for the content provider. Simultaneously, support for the principle of fair use may require allowing consumers to access content in ways not foreseen by the provider. While the now-commonplace digitization of many types of content, such as music, film, video and literary work, has resulted in efficient, effective distribution of the content, digitization has also made piracy of the content easier and more widespread, as the content may be duplicated quickly without reduction in quality any number of times and without regard to whether the resulting copy is of a second or later generation.

In an effort to prevent piracy of digitized content, providers have often employed various technological measures as part of a Digital Rights Management (DRM) scheme, which typically outlines the rights and restrictions associated with the use of the content, and provides the technological measures and related requirements for enforcing the license. One example of a DRM scheme is the Content Scrambling System (CSS) often employed to prevent viewing of Digital Video Discs (DVDs) on unlicensed or unauthorized DVD players. Many other DRM schemes associated with various forms of digital content have also been utilized, with varying success in allowing authorized users to access the protected content while preventing piracy.

In some DRM schemes, a content provider may set a time limit on the accessibility of the content by the user. For example, a user may pay to rent a particular work, such as an audio or video presentation. In return, the provider may allow access to the content for a limited period of time, beginning at some predetermined date and time, or starting with an initial access of the content by the user. To enforce these license restrictions, the provider may require that the device facilitating the user access to the content include a system clock capable of enforcing the provider's time restrictions. Further, to hinder the user from circumventing the license restrictions, the provider may call for the particular clock system employed to be secured against potential user tampering.

In one particular example of a time-based restriction, a user may only have until Friday at noon to access the rented content. If the user wishes to access the content on Saturday, he may attempt to turn back the current time value of the system clock to indicate Friday before noon so that the content may still be accessed. A secure system clock could be used to prevent such a modification.

Unfortunately, no matter how much care has been taken to make DRM technological measures foolproof, many anti-piracy schemes, including those employing the secure clocks mentioned above, may be defeated by motivated and technically astute individuals. In other words, despite attempts to prevent the user from accessing a secure clock, the user may be able to circumvent the clock security measures to modify the system date and time, thus allowing the user to access the content in violation of the terms set forth in the content license. In other cases, legitimate attempts of the user to access a system clock, such as to realign the clock with the current time to correct for inherent frequency "drift," may unnecessarily be thwarted in order to maintain the security of the clock.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

The enclosed drawings and the following description depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described below can be combined in various ways to form multiple embodiments of the invention. As a result, the invention is not limited to the specific embodiments described below, but only by the claims and their equivalents.

Figure 1:
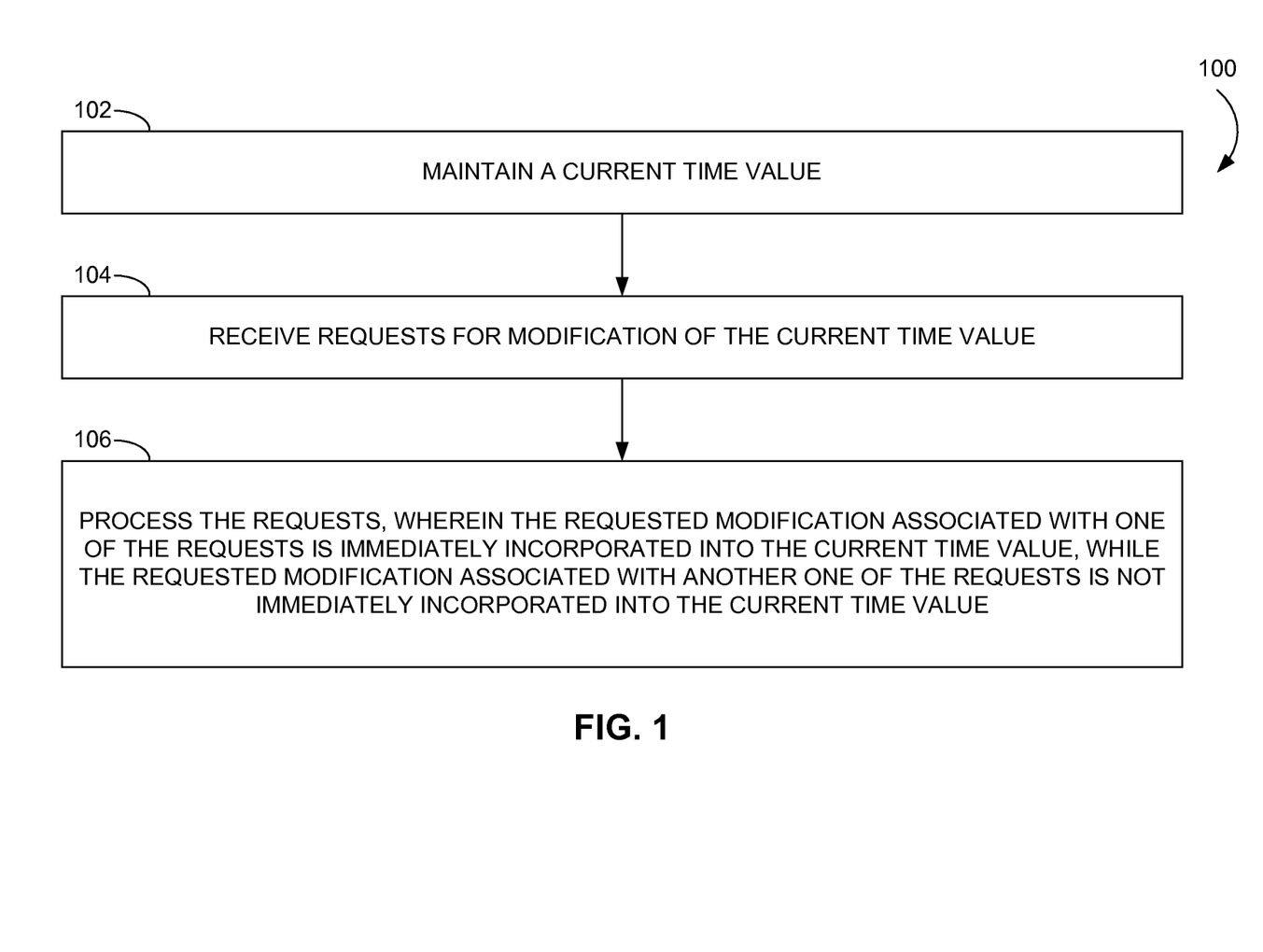
FIG. 1 is a flow diagram of a method according to an embodiment of the invention for employing a controlled-modification current time value.

FIG. 1 provides a flow diagram of a method 100 for employing a controlled-modification current time value. In the method 100, a current time value is maintained (operation 102). Requests for modification of the current time value are received (operation 104). Each of the requests are then processed (operation 106). More specifically regarding the processing operation, the requested modification associated with one of the requests is immediately incorporated into the current time value, while the requested modification associated with another one of the requests is not immediately incorporated into the current time value. While FIG. 2 indicates a particular order of execution of the operations 102-106, other orders of execution, including simultaneous or concurrent execution of two or more of the operations 102-106, may be employed in other implementations. In another example, a computer-readable medium may have instructions encoded thereon that are executable by a processor for performing the operations 102-106 of the method 100.

Figure 2:
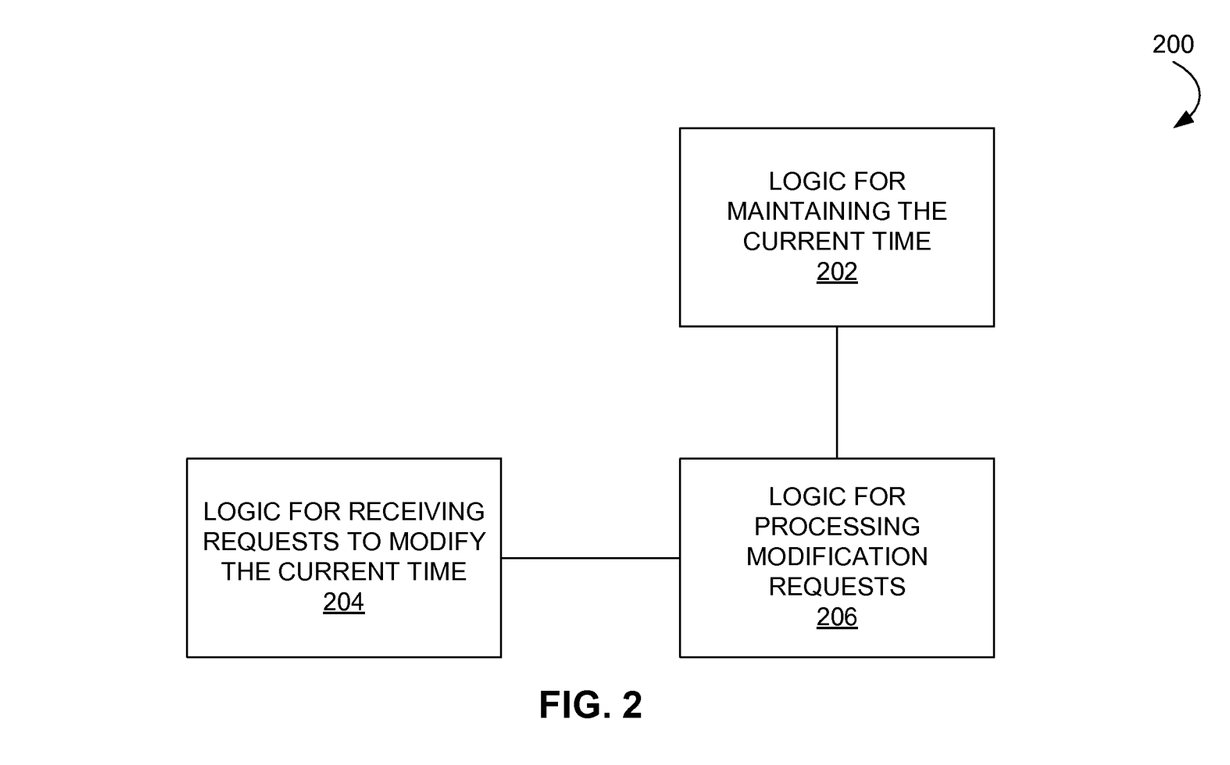
FIG. 2 is a block diagram of a system for maintaining a controlled-modification current time value according to an embodiment of the invention.

Another embodiment, a system 200 for maintaining a controlled-modification current time value is shown in FIG. 2. The system 200 includes logic 202 configured to maintain a current time value, logic 204 configured to receive requests for modification of the current time value, and logic 206 for processing the requests. The processing logic 206 operates such that the requested modification associated with one of the requests is immediately incorporated into the current time value, and such that the requested modification associated with another one of the requests is not immediately incorporated into the current time value.

Figure 3:
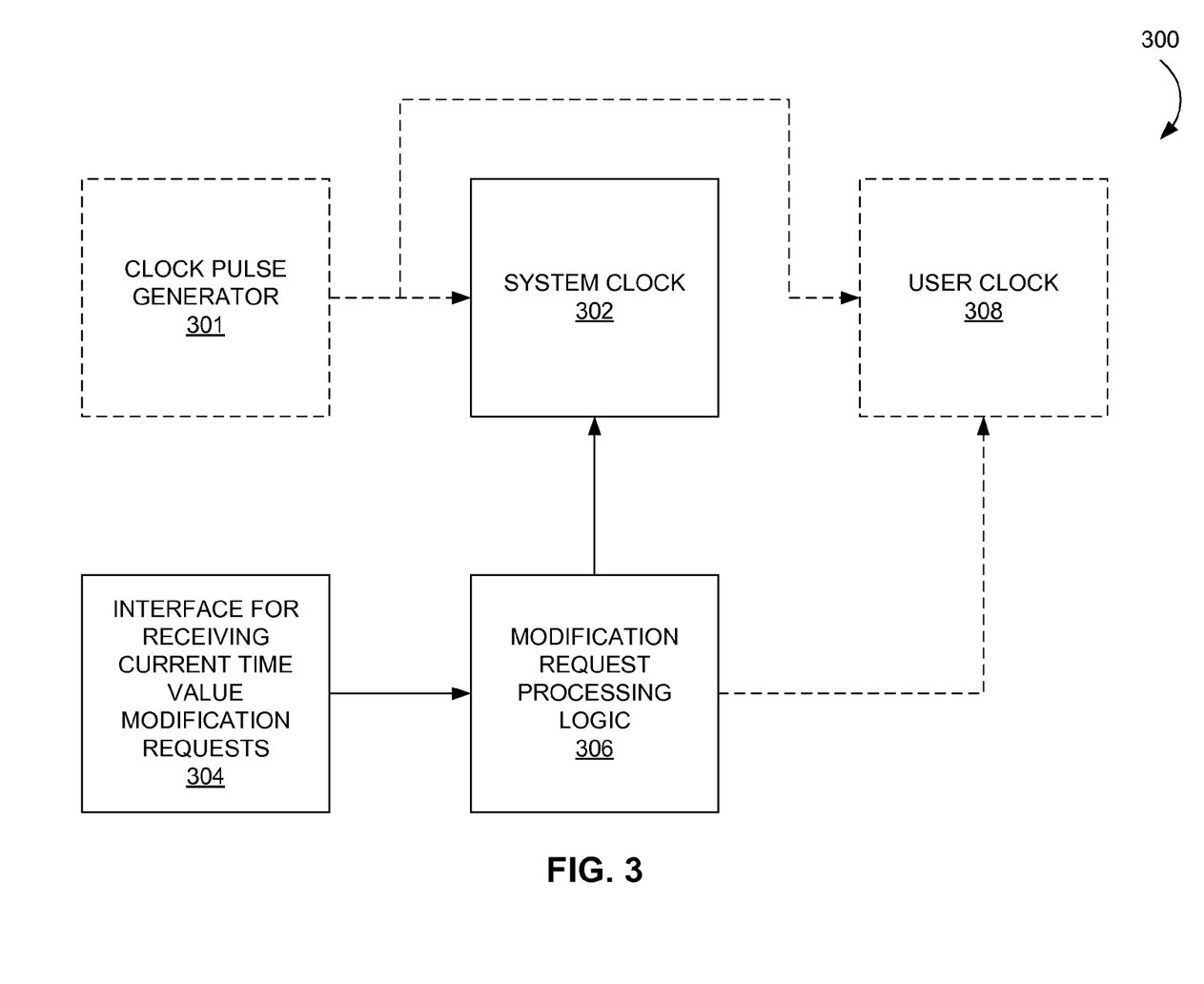
FIG. 3 is a block diagram of a system for maintaining a controlled-modification current time value according to another embodiment of the invention.

Another embodiment of the invention—a system 300 for both maintaining and controlling the modification of a current time value—is depicted in the block diagram of FIG. 3. Such a system 300 may be employed in any of a number of devices configured to allow a user or consumer to access digital content of an artistic, expressive, or informational nature. For example, a satellite, cable, or terrestrial ("over-the-air") television receiver or set-top box configured to allow access to video and audio programming via a satellite or cable broadcast system may contain such a system 300 to control user access to the provided content according to the license restrictions outlined by the content provider. In another example, a personal computer employed by a user to access audio, video or textual content may include the system 300 to control user access to the content. Other devices, such as Compact Disc (CD) players, Digital Video Disc (DVD) players, Motion Picture Experts Group 1, Audio Layer 3 (MP3) players, and other stationary or portable devices allowing access to such content may incorporate the system 300.

In FIG. 3, the system 300 includes a system clock 302, an interface 304 for receiving requests for modifying a current time value represented by the system clock 302, and processing logic 306 for processing the modification requests. Optionally, the system 300 may include a clock pulse generator 301 for driving the system clock 302. Also, the system 300 may further contain a user clock 308 viewable by a user. Each of these components is described in greater detail below.

The system clock 302 provides logic for maintaining a current time value. In one embodiment, the system clock 302 includes a running indication of the current day and time at the location of the system 300, or at some other location. In another example, the current day and time may be represented in an absolute time reference, such as Greenwich Mean Time (GMT), plus a local time zone or other indicator denoting an offset from the absolute time reference. Alternatively, the current day and time may be denoted by GMT, regardless of the location of the system 300. The system clock 302 may be implemented as hardware, software, firmware, or some combination thereof. Typically, a source of electronic clock pulses drives the system clock 302 so that the current time value may be maintained. In one embodiment, the system clock 302 receives the clock pulses from a source external to the system 300, such as by way of a clock signal received over a conductor, optical connection, wireless link, or other capable means. In another embodiment, a clock pulse generator 301 incorporated within the system 300 may provide the clock pulses to the system clock 302. One potential clock pulse generator 301 may be a crystal oscillator commonly employed in many digital electronics products.

The interface 304 of the system 300 is configured to receive requests for modification of the current time value being maintained by the system clock 302. In one embodiment, the interface 304 may be coupled with a user interface allowing a user to request modification of the current time value. In another implementation, the interface 304 may receive electronic signals requesting an update of the current time value, wherein the signals are generated external to a device containing the system 300. Such signals may be sourced, for example, from a network server, wireless transmitter, or the like to periodically realign the current time value with an atomic clock or other time reference. In another example, the interface 304 may further be configured to accept requests from either the user or the externally-generated signals, or from some other source.

The modification requests may indicate the particular modification desired in a number of ways. For example, the request may directly state the date and time to be reflected by the current time value, either in a standard time reference, such as GMT, or with respect to another predefined time zone. In another implementation, the request may indicate the amount of time the current time value is to be shifted, along with an indication of the relative direction of the shift (i.e., earlier or later). Further, if the current time is reflected as GMT in conjunction with a time zone or similar offset value, the modification request may be stated as a new time zone. In other embodiments, the request may indicate the desired modification in other formats.

Figure 4:
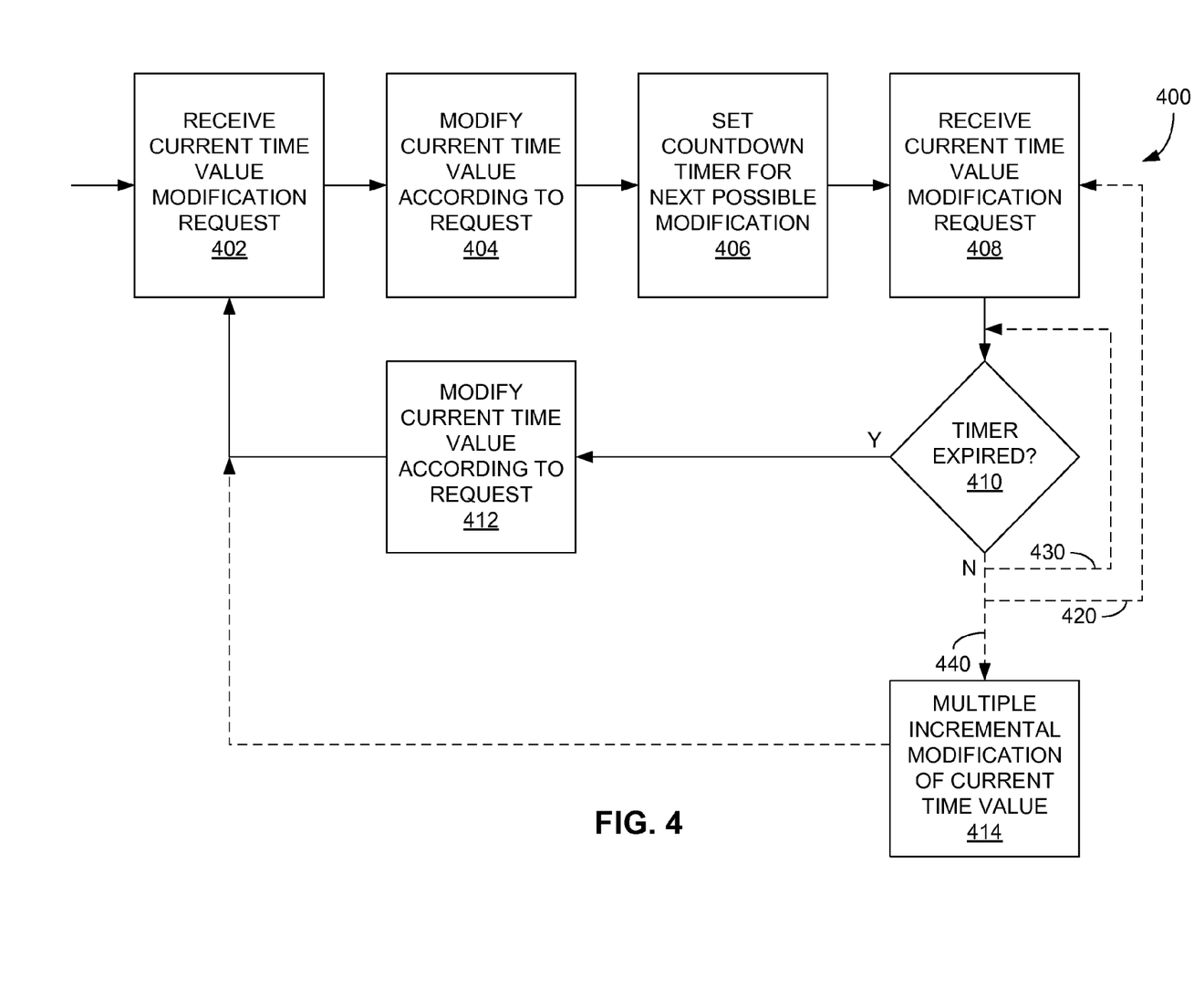
FIG. 4 is a flow diagram of several methods according to embodiments of the invention for controlling modification of a current time value.

Continuing with the system 300 of FIG. 3, the processing logic 306 processes the modification requests received at the interface 304. Generally, one or more of the modification requests may be immediately incorporated into the current time value, while one or more of the other requests may be ignored, reduced in magnitude, delayed, or some combination thereof. FIG. 4 presents a flow diagram of a possible method 400 for processing the modification requests in the processing logic 306, wherein the method 400 provides any of several different processing options. First, a request for modifying the current time value of the system clock 302 is received at the processing logic 306 from the interface 304 (operation 402). The processing logic 306 then immediately modifies the current time value according to the request (operation 404). Also, a countdown timer (not shown in FIG. 3) within the processing logic 306 is set (operation 406). The countdown timer may track time in a fashion similar to the current time value of the system clock 302. In another embodiment, the countdown timer may count a number of clock pulses received, or employ other means to track the passage of time. The processing logic 306 utilizes the countdown timer to determine how future modification requests are to be handled.

When another modification request is received (operation 408), the processing logic 306 determines whether the countdown timer has expired (operation 410). If the timer has expired, the processing logic 306 may then modify the current time value represented by the system clock 302 according to the modification request (operation 412) and then wait for the next modification request (operation 402). If, instead, the timer has not expired (operation 410), the processing logic 306 may employ any of a number of options 420, 430, 440 to handle the latest modification request. For example, the processing logic 306 may altogether ignore the request (option 420) without processing the request and then wait for the next modification request (operation 408), thus prohibiting further modifications of the current time value until the timer expires. As a result, unfettered modification of the current time value is not allowed, thus at least impeding a user's ability to alter the current time value in order to circumvent time restrictions imposed on licensed access to content. In one embodiment, the amount of time set in the countdown timer may be a function of the magnitude of the modification associated with the first request. In other words, a longer modification request may result in a longer countdown value, thus helping prevent the current time value from being repeatedly set back to the same day and time. In another embodiment, the value of the countdown timer may be increased for each modification request received while the countdown timer is still active, thereby making further modification of the current time value more difficult. In one implementation, the processing logic 306 may cause an indication to be passed to the user indicating that the requested modification was ignored or prohibited.

In another option (option 430), the processing logic 306 may instead wait until the timer expires (operation 410), and then modify the current time value according to the request (operation 412) before awaiting another modification request (operation 402). In one embodiment, subsequent modification requests received before the timer has expired may be ignored or prohibited. In another example, the subsequent modification requests are stored or buffered for later incorporation into the current time value. As a result, the requested modification is ultimately reflected in the current time value, albeit in a delayed fashion to prevent frequent instantaneous changes in the current time value that may allow violation of content use restrictions.

As with the first option 420, the amount of time set in the countdown timer in the second option 430 may be related to the magnitude of the modification associated with the first request so that requested modifications of a higher magnitude result in higher delay times. Also, as described above, the processing logic 306 may increase the value of the countdown timer for each further modification request received while the countdown timer is still active, hence making further modification of the current time value more arduous and ineffective.

Figure 5:
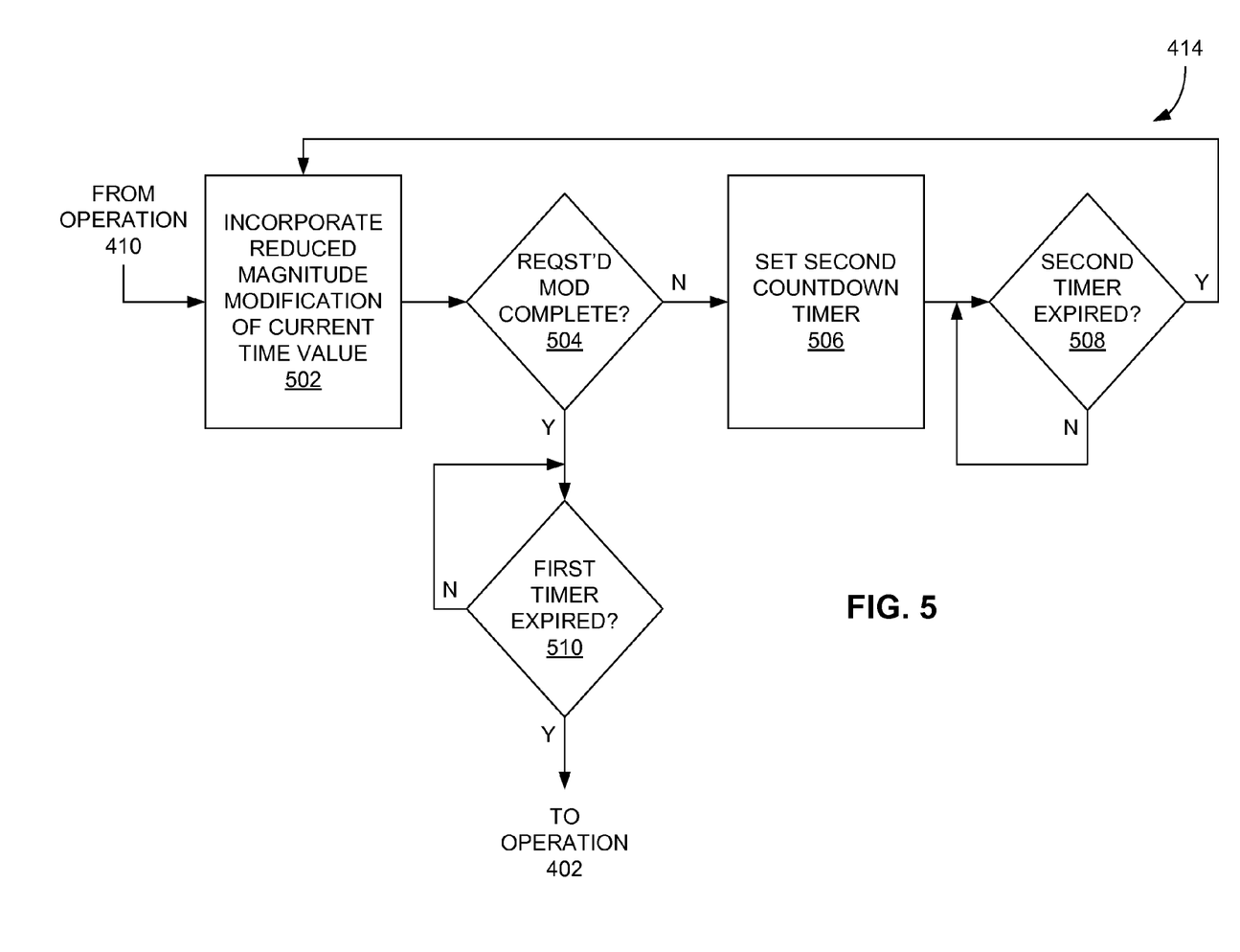
FIG. 5 is a flow diagram of a method according to an embodiment of the invention for controlling modification of a current time value by converting a modification of a current time value into several reduced modifications over a period of time.

In another option (option 440), the processing logic 306 modifies the current time value incrementally over a period of time (operation 414). FIG. 5 provides a flow diagram of one possible example of operation 414. Therein, the processing logic 306 modifies the current time value at a reduced magnitude than requested (operation 502). The processing logic 306 may then determine if the requested modification is complete (i.e., the current time value reflects the requested modification) (operation 504). If not, a second countdown timer is set to instigate a time delay (operation 506). Once the second timer has expired (operation 508), the processing logic 306 may then incorporate another reduced modification of the current time value (operation 502) and check if the requested modification is complete (operation 504). The processing logic 306 may continue to operate in this manner, periodically revising the current time value until the total number of modifications equals the requested modification. Modification requests received in the interim may be either buffered or ignored. Once the requested modification is incorporated into the current time value, the processing logic 306 can receive another modification request to be processed (operation 402). In one example, the processing logic 306 waits until the first timer has expired (operation 510) before receiving another modification request (operation 402). As a result, processing logic 306 may begin to incorporate the requested modification into the current time value immediately, but delay the complete effect of the modification until a later time when controlled access to content is less likely to be compromised.

In one example of the third option 440, modification of the current time value may occur in a linear fashion, with a modification of a constant magnitude being incorporated into the current time value at constant time periods. In other embodiments, the current time value may be updated at varying magnitudes and at non-periodic time intervals, according to the specific needs of the particular application being addressed.

In one embodiment, the processing logic 306 may be configured to allow smaller adjustments of the current time value without delay, while preventing more substantial modifications. For example, modifications of the current time on the order of a few seconds or less are common when a system or device is being corrected periodically by way of a network server or other system having access to an extremely accurate time reference, such as an atomic clock. To this end, the processing logic 306 may employ a threshold in determining whether modifications are to be incorporated into the current time value immediately, or will otherwise be ignored, delayed, or phased in over a period of time.

Figure 6:
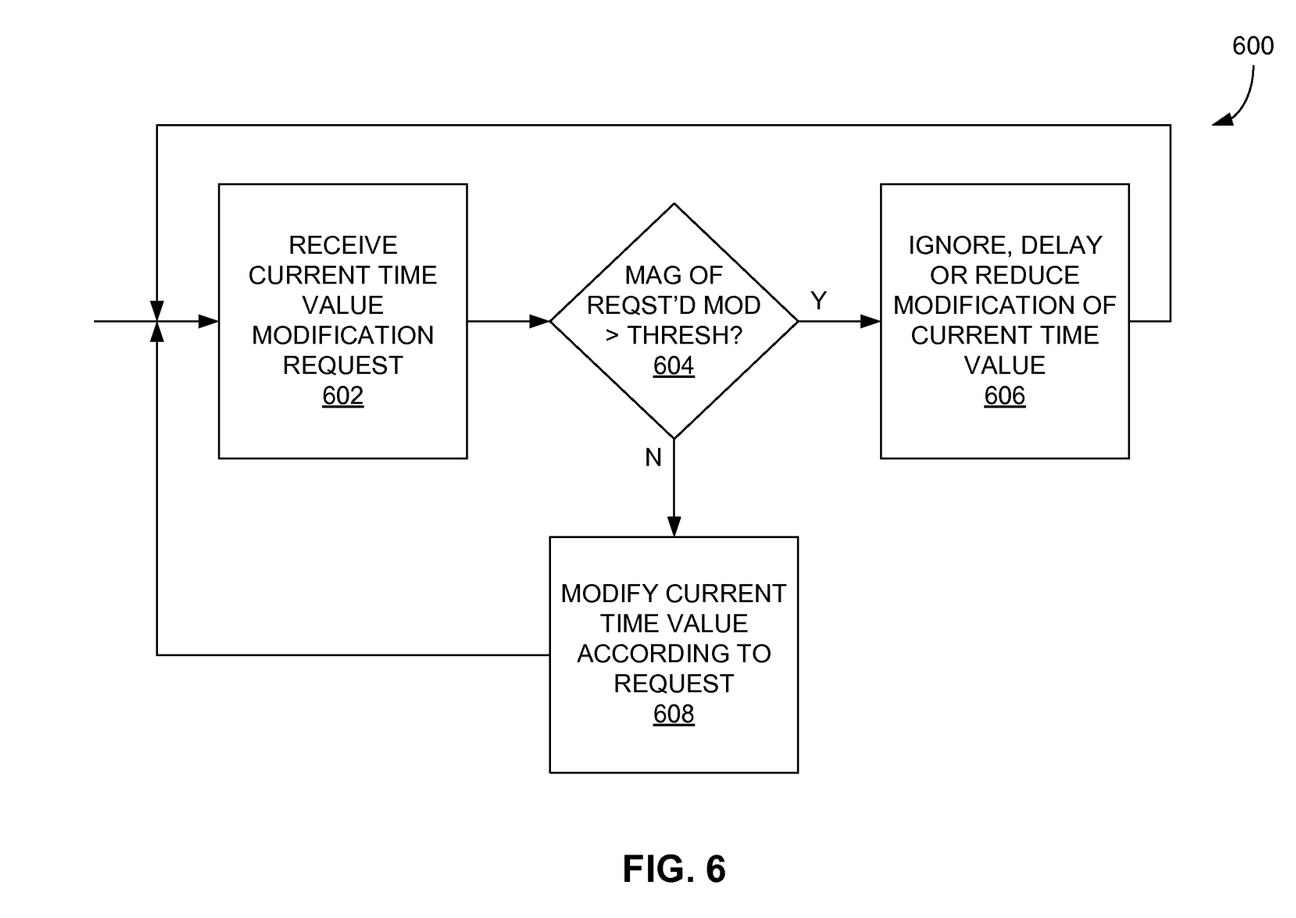
FIG. 6 is a flow diagram of a method according to another embodiment of the invention for controlling modification of a current time value by way of a threshold.

FIG. 6 provides a flow diagram depicting one possible option for the employment of a threshold by the processing logic 306. As before, the processing logic 306 receives a request to modify the current time value (operation 602). The processing logic 306 then determines if the magnitude of the modification of the current time value (i.e., the amount of time the current time value is to be shifted) is greater than a predetermined threshold (operation 604). If so, the modification request may be ignored, or the resulting modification of the current value time may be delayed or reduced (operation 606). Otherwise, the processing logic 306 may modify the current time value according to the request (operation 608). Such a process may allow smaller modifications of the current time value, such as periodic corrections to realign the current time value with an external reference, while preventing, delaying or reducing larger changes that may adversely affect content security.

In conjunction with the method of FIG. 6, the number of smaller current time value modifications requested below the threshold may be compared to a limit. If this limit is exceeded, further modification requests below the threshold may also be ignored, delayed or reduced in magnitude for at least some period of time, thus preventing the accumulation of smaller modifications which may collectively shift the current time value significantly.

In another embodiment, the treatment or processing of the various requests received through the interface 304 may vary depending on the source of the request. For example, user-generated requests may be subjected to the processing discussed above in conjunction with the methods of FIGS. 4-6, while other requests received externally, such as by way of a network server or wireless transmitter, may be incorporated into the system clock 302 unconditionally, thus circumventing the processing of the requests described above. Such an embodiment may be employed if the source of external requests may be verified or certified as a trustworthy source for requests of modification of the current time value. In one implementation, the modification request processing logic 306 may verify the source of the request before incorporating the request into the system clock 302.

Returning to FIG. 3, the system 300 may further couple the processing logic 306 with a second clock, termed a user clock 308. The processing logic 306 may immediately update the user clock 308 according to one or more modification requests of the current time value of the system clock 302, including those modifications that have been delayed, reduced, or otherwise altered. Further, a user of the device incorporating the system 300 may be allowed to view or access the user clock 308 for verification regarding the acceptance of the request. As a result, delays or reductions in the requested modifications of the current time value may cause at least temporary differences between the system clock 302 and the user clock 308. In one embodiment, once all outstanding modification delays have been incorporated into the current time value of the system clock 302, the system clock 302 and the user clock 308 may represent the same current time value. In another implementation, a time offset from the system clock 302 may be employed instead of the user clock 308. Accordingly, a user clock value would be produced by presenting the current value of the system clock 302 modified by the stored time offset.

According to another embodiment, the system clock 302 and the user clock 308 may purposely represent different values. For example, the system clock 302 may be set to an absolute time reference, such as GMT, regardless of the location of the system 300, while the user clock 308 represents local time by way of the absolute time reference and a stored local time zone or similar offset. In that case, modifications to the local time zone do not affect the system clock 302, and may thus be implemented upon request regardless of the magnitude of the time zone change, as these changes only impact the value of the user clock 308.

While each of the methods discussed above for controlling modification of the current time value have been explained separately to simplify the associated discussion, one or more of these embodiments may be combined to yield further implementations. For example, the threshold employed in the method 600 of FIG. 6 may be incorporated with the process 414 of FIG. 5 so that only requested modifications of the current time value above the threshold may be implemented as a set of smaller modifications spread out over a period of time. Other combinations of the various embodiments discussed above are possible as well.

In one embodiment, selection of the various methods and options explained above, as well as specific threshold values, time delay values, and the like, may be programmable. For example, these parameters may be defined by way of a contract or license agreement governing the use of content being accessed by the device incorporating the system 300. In another embodiment, each of the various parameters and methods described herein could be implemented as a standardized DRM license agreement, thus allowing various content providers to unambiguously relay their requirements for allowing access to content in a secure manner.

As described above, various embodiments of the present invention provide a means of controlling modifications to a current time value without completely prohibiting such modifications. As a result, some time value modifications, such as realigning the current time value with an external reference, may be permitted, while more radical changes to the timer may be either prohibited or delayed in some fashion to restrict the ability of a user to circumvent technological measures intended to control access to digital content. An advantage of various embodiments may be to curtail attempts at violating the terms of a license for accessing digital content without the expense and difficulties associated with implementing a "secure" clock that attempts to prevent all unauthorized access to the system clock.

While several embodiments of the invention have been discussed herein, other embodiments encompassed by the scope of the invention are possible. For example, while embodiments of the invention have been described within the environment of providing secure access to digital content, any system requiring control over modification of a current time value may benefit from application of the concepts described herein. Also, aspects of one embodiment may be combined with those of alternative embodiments to create further implementations of the present invention. Thus, while the present invention has been described in the context of specific embodiments, such descriptions are provided for illustration and not limitation. Accordingly, the proper scope of the present invention is delimited only by the following claims and their equivalents.

What is claimed is:

1. A method for employing a controlled-modification current time value, the method comprising: maintaining the current time value; receiving a request to modify the current time value; tracking an amount of time of a countdown timer, wherein the countdown timer is set in response to receiving a previous request to modify the current time value; and processing the requested modification, wherein the requested modification is immediately incorporated into the current time value if the countdown timer amount of time has expired, and wherein the requested modification associated with the request is not immediately incorporated into the current time value if the countdown timer amount of time has not expired, wherein the amount of time of the countdown timer is based upon a function of a magnitude of the previous requested modification, wherein the amount of time of the countdown timer increases with an increasing amount of adjustment to the current time made in response to the previous request.

2. A system for maintaining a controlled-modification current time value, the system comprising: a system clock configured to maintain a current time; an interface configured to receive a request to modify the current time of the system clock; and a processor configured to: execute first logic configured to maintain the current time value kept by a system clock; execute second logic configured to receive a request at the interface to modify a current time value; execute third logic configured to track an amount of time of a countdown timer, wherein the countdown timer is set in response to receiving a previous request at the interface to modify the current time value; and execute fourth logic configured to process the request, wherein the requested modification is immediately incorporated into the current time value if the countdown timer amount of time has expired, and wherein the requested modification associated with another one of the requests is not immediately incorporated into the current time value if the countdown timer amount of time has not expired, wherein the fourth logic is configured to delay the requested modification for a period of time, wherein the period of time corresponds to a period of time associated with the expiration of the countdown timer.

3. A system for maintaining a controlled-modification current time value, the system comprising: a system clock configured to maintain a current time; an interface configured to receive a request to modify the current time of the system clock; and a processor configured to: execute first logic configured to maintain the current time value kept by a system clock; execute second logic configured to receive a request at the interface to modify a current time value; execute third logic configured to track an amount of time of a countdown timer, wherein the countdown timer is set in response to receiving a previous request at the interface to modify the current time value; and execute fourth logic configured to process the request, wherein the requested modification is immediately incorporated into the current time value if the countdown timer amount of time has expired, and wherein the requested modification associated with another one of the requests is not immediately incorporated into the current time value if the countdown timer amount of time has not expired, wherein the fourth logic is configured to delay the requested modification for a period of time, wherein the period of time corresponds to a period of time associated with the expiration of the countdown timer, and wherein the period of time of the delay is a function of a magnitude of the requested modification.

* * * * *